US 9,002,977 B2

(12) United States Patent
Thaxter et al.

(10) Patent No.: US 9,002,977 B2
(45) Date of Patent: Apr. 7, 2015

(54) METHODS AND SYSTEMS FOR DISTRIBUTING AND ACCESSING CONTENT ASSOCIATED WITH AN E-BOOK

(75) Inventors: Gwendolyn M. Thaxter, Ridgefield, CT (US); Brian F. Roberts, Dallas, TX (US); Frank A. McKiel, Jr., Colorado Springs, CO (US); Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 346 days.

(21) Appl. No.: 12/983,174

(22) Filed: Dec. 31, 2010

(65) Prior Publication Data
US 2012/0173659 A1 Jul. 5, 2012

(51) Int. Cl.
*G06F 15/16* (2006.01)
*G06F 15/02* (2006.01)
*G06F 3/0481* (2013.01)

(52) U.S. Cl.
CPC ........ *G06F 15/0291* (2013.01); *G06F 3/04817* (2013.01); *G06F 2203/04803* (2013.01)

(58) Field of Classification Search
CPC ........................... G06F 17/241; G06F 15/0291
See application file for complete search history.

(56) References Cited

U.S. PATENT DOCUMENTS

| 2006/0041561 | A1* | 2/2006 | Singer et al. ............... 707/10 |
| 2008/0168073 | A1* | 7/2008 | Siegel et al. ............... 707/100 |
| 2009/0254802 | A1* | 10/2009 | Campagna et al. ........... 715/209 |
| 2012/0001923 | A1* | 1/2012 | Weinzimmer et al. ........ 345/473 |
| 2012/0036423 | A1* | 2/2012 | Haynes et al. ............... 715/230 |
| 2012/0084634 | A1* | 4/2012 | Wong et al. ................. 715/233 |
| 2013/0013812 | A1* | 1/2013 | Kessel et al. ................. 709/248 |
| 2013/0185657 | A1* | 7/2013 | Gunawardena et al. ...... 715/753 |

OTHER PUBLICATIONS

Copia marketing brochure received at Consumer Electronics Show 2011, Jan. 5, 2011.

* cited by examiner

Primary Examiner — Djenane Bayard

(57) ABSTRACT

Exemplary methods and systems for distributing and accessing content associated with an e-Book are disclosed herein. An exemplary method includes a content management subsystem receiving data representative of additional content associated with a particular passage of an e-Book from a first e-reader device and transmitting the data representative of the additional content to a second e-Book reader device for presentation in conjunction with the particular passage of the e-Book. Corresponding methods and systems are also disclosed.

23 Claims, 17 Drawing Sheets

METHODS AND SYSTEMS FOR DISTRIBUTING AND ACCESSING CONTENT ASSOCIATED WITH AN E-BOOK

BACKGROUND INFORMATION

The advent of e-Books and e-Book reader devices has allowed for the convenient distribution and access of literature in electronic format. For example, publishers are able to disseminate e-Books without the overhead costs typically associated with producing and distributing printed publications. Similarly, users are able to conveniently store, access, and/or transport vast libraries worth of books by way of a single e-Book reader device that can fit in the user's bag or pocket.

Many users of e-Book reader devices would be interested in utilizing such e-Book reader devices to share and/or access additional content associated with an e-Book. For example, many users would enjoy utilizing e-Book reader devices to communicate and/or exchange content (e.g., images, video, etc.) with other users regarding particular passages of an e-Book. Unfortunately, however, traditional e-Books, e-Book reader devices, and e-Book software applications fail to facilitate the distribution of information and/or other content between users in such a manner.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

DETAILED DESCRIPTION OF PREFERRED EMBODIMENTS

Figure 1:
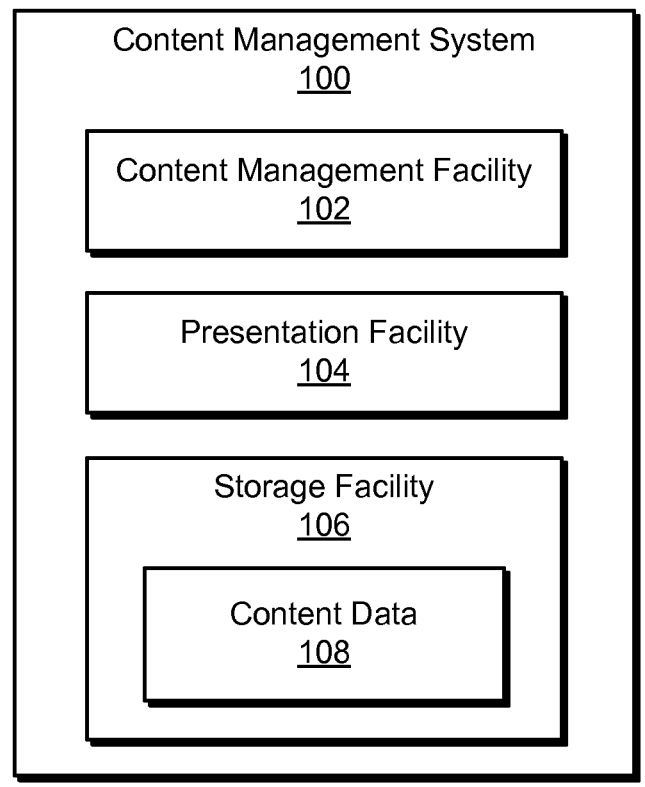
FIG. 1 illustrates an exemplary content management system according to principles described herein.

Exemplary methods and systems for distributing and accessing content associated with an e-Book are disclosed herein. As described in more detail below, an exemplary method may include a content management subsystem receiving data representative of additional content associated with a particular passage of an e-Book from a first e-reader device and transmitting the data representative of the additional content to a second e-Book reader device for presentation in conjunction with the particular passage of the e-Book. An additional or alternative exemplary method may include an e-Book reader device receiving data representative of additional content associated with a particular passage of an e-Book and presenting the additional content in conjunction with the particular passage. In some examples, the additional content received by the e-Book reader device may be provided by way of one or more additional e-Book reader devices.

As will be explained in more detail below, the exemplary methods and systems disclosed herein may facilitate an exchange of content between multiple e-Book reader device users regarding discrete portions of an e-Book. For example, the methods and systems disclosed herein may facilitate the creation, distribution, management, and/or access of comments, images, and/or other content associated with a particular passage of an e-Book and/or provided by users of e-Book reader devices. Accordingly, the methods and systems disclosed herein may enhance a user's experience with and/or understanding of a corresponding e-Book. Additional benefits and/or advantages will be apparent from the details disclosed herein.

As used herein, the term "e-Book reader device" may refer to any e-Reader, e-Book device, and/or any other suitable computing device configured to access, read, and/or display an e-Book for experiencing (e.g., reading, viewing, etc.) by a user. In some examples, an e-Book reader device may include a computing device (e.g., a mobile phone device, a handheld device, a laptop computer, a tablet computer, a personal-digital assistant device, a personal computer, etc.) implementing one or more software applications that allow the computing device to access, read, and/or display e-Books. In additional or alternative examples, an e-Book reader device may be a "dedicated e-Book reader device" (e.g., a Kindle, a Nook, etc.) that is configured to be used primarily as an e-Book reader device.

As used herein, the term "e-Book" may refer to any publication published in electronic/digital form. For example, an e-Book may include the electronic form of a book, a newspaper, a magazine, any other suitable publication, and/or any portion thereof. An e-Book may include text, one or more images (e.g., photographs, illustrations, graphs, tables, etc.), and/or any other suitable content associated with the corresponding publication. In some examples, an e-Book may be the digital equivalent of a corresponding printed publication. An e-Book may be published in accordance with any suitable e-Book formats and/or technologies. In some examples, an e-Book may be published in accordance with a proprietary e-Book format (e.g., in accordance with one or more digital rights management technologies).

As used herein, the term "particular passage" may refer to any discrete and/or granular portion of an e-Book. For example, a particular passage may include one or more words, one or more sentences, one or more paragraphs, one or more pages, one or more chapters, and/or any other suitable discrete portion of an e-Book. Additionally or alternatively, a particular passage may include one or more images of an e-Book or any portion thereof.

As used herein, the terms "content" and "additional content" may refer to any suitable content that may be associated with an e-Book. For example, exemplary additional content may include text, a communication (e.g., a post, a comment, etc.), an image (e.g., a photograph, an illustration, etc.), a citation (e.g., a citation to another e-Book or other publication), a news article, a video, a song, a sound, or any segment, component, or combination of these or other forms of additional content that may be viewed or otherwise experienced by a user and associated with an e-Book. In some examples, additional content may be user generated. For example, a user may provide one or more comments regarding a particular passage of an e-Book, as will be explained in more detail below. Additionally or alternatively, the user may be the creator/owner of and/or provide one or more images associated with a particular passage of an e-Book. To illustrate, a user may create and provide one or more illustrations comprising the user's renditions of one or more characters, places, items, events, etc. from an e-Book. In additional or alternative examples, a user may generate (e.g., take) and provide photographs of one or more places, persons, or objects discussed in an e-Book.

In some examples, an association of additional content with an e-Book does not modify the data representative of the e-Book. For example, data representative of additional content associated with an e-Book may be maintained separate from data representative of the e-Book itself. To illustrate, the data representative of the additional content may be stored in one or more files separate from one or more files that store data representative of the corresponding eBook content.

Exemplary systems and methods will now be described in reference to the drawings.

FIG. 1 illustrates an exemplary content management system 100 (or simply "system 100"). As will be described in more detail below, system 100 may be configured to facilitate the creation, distribution, and/or access of additional content associated with a particular passage of an e-Book by way of one or more e-Book reader devices.

System 100 may include, but is not limited to, a content management facility 102 (or simply "management facility 102"), a presentation facility 104, and a storage facility 106, which may be in communication with one another using any suitable communication technologies. It will be recognized that although facilities 102-106 are shown to be separate facilities in FIG. 1, any of facilities 102-106 may be combined into fewer facilities, such as into a single facility, or divided into more facilities as may serve a particular implementation.

As will be described in more detail below, management facility 102 may be configured to manage, govern, facilitate, and/or control the creation, distribution, access, and/or presentation of additional content associated with a particular passage of an e-Book. For example, management facility 102 may be configured to allow a user to generate and/or provide additional content associated with a particular passage of an e-Book by way of an e-Book reader device, receive data representative of additional content by way of an e-Book reader device, and/or transmit data representative of additional content to an e-Book reader device for presentation in conjunction with a particular passage of an e-Book, as will be explained in more detail below.

Presentation facility 104 may be configured to present, by way of an e-Book reader device, additional content associated with a particular passage of an e-Book. For example, presentation facility 104 may be configured to direct an e-Book reader device to display the additional content by way of a display screen. In some examples, presentation facility 104 may be configured to present the additional content in conjunction with (e.g., simultaneously with) the corresponding particular passage of the e-Book. Accordingly, a user may access additional content associated with a particular passage of an e-Book without having to exit/navigate away from an e-Book or corresponding e-Book software application and/or without having to open a separate window or software application (e.g., such as a web browser). In some examples, presentation facility 104 may be configured to present the additional content overlaid or superimposed onto at least a portion of the e-Book and/or particular passage. Additionally or alternatively, presentation facility 104 may be configured to present one or more options (e.g., selectable options, form-fillable options, etc.) associated with the additional content. For example, presentation facility 104 may present one or more selectable options configured to allow a user to create, share, access, filter, and/or otherwise interact with additional content.

Additionally or alternatively, presentation facility 104 may be configured to present promotional content (e.g., advertisements, promotional offers, etc.) associated with an e-Book and/or a particular passage of the e-Book. In some examples, the promotional content may be targeted to a particular group of users (e.g., a book club). Presentation facility 104 may be configured to present the promotional content in any suitable manner. For example, presentation facility 104 may display information and/or links associated with the promotional content by way of a display screen associated with an e-Book reader device.

Storage facility 106 may be configured to maintain content data 108 representative of and/or associated with additional content. For example, content data 108 may include data representative of additional content itself, data representative of statistics associated with the additional content, data representative of information linking the additional content to corresponding portions (e.g., particular passages) of an e-Book, and/or any other suitable data associated with the additional content. Storage facility 106 may be configured to maintain additional or alternative data as may serve a particular implementation.

Figure 2:
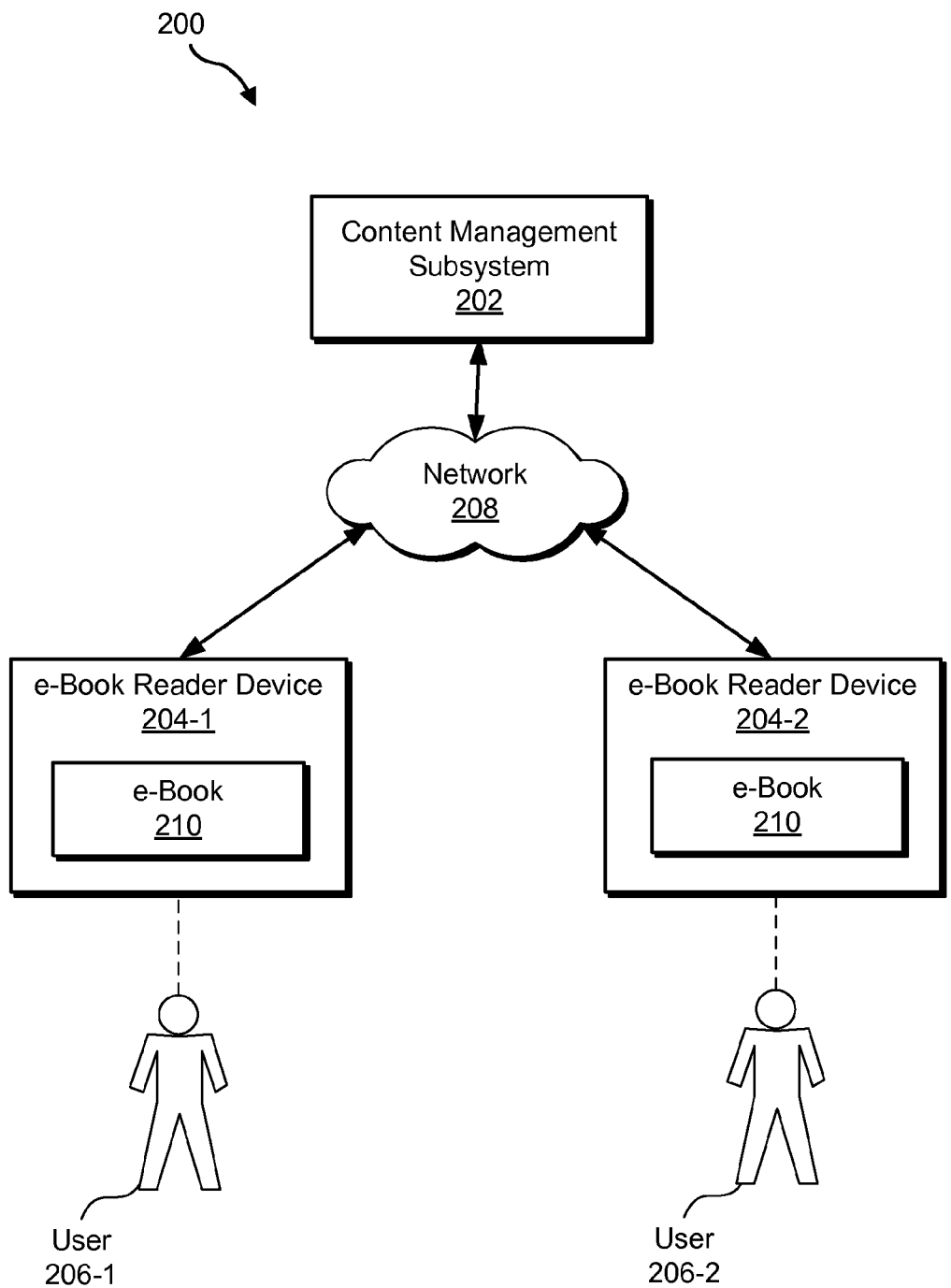
FIG. 2 illustrates an exemplary implementation of the system of FIG. 1 according to principles described herein.

FIG. 2 illustrates an exemplary implementation 200 of system 100 wherein a content management subsystem 202 (or simply "management subsystem 202") is communicatively coupled to a first e-Book reader device 204-1 associated with a first user 206-1 and a second e-Book reader device 204-2 associated with a second user 206-2 (first e-Book reader device 204-1 and second e-Book reader device 204-2 may be collectively referred to herein as "e-Book reader devices 204"). As will be described in more detail below, management facility 102, presentation facility 104, and storage facility 106 may each be implemented on one or all of management subsystem 202 and e-Book reader devices 204. Although implementation 200 includes two e-Book reader devices, one will appreciate that additional and/or alternative implementations of system 100 may include any other suitable number of e-Book reader devices.

Management subsystem 202 and e-Book reader devices 204 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

In certain embodiments, management subsystem 202 and e-Book reader devices 204 may communicate via a network 208, which may include one or more networks, including, but not limited to, wireless networks (Wi-Fi networks), wireless communication networks (e.g., 3G and 4G networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, local area networks, and any other networks capable of carrying data and/or communications signals between management subsystem 202 and e-Book reader devices 204. Communications between management subsystem 202 and e-Book reader devices 204 may be transported using any one of the above-listed networks, or any combination or sub-combination of the above-listed networks.

While FIG. 2 shows management subsystem 202 and e-Book reader devices 204 communicatively coupled via network 208, it will be recognized that management subsystem 202 and e-Book reader devices 204 may be configured to communicate one with another in any other suitable manner (e.g., via direct connections).

In some examples, management subsystem 202 may be configured to receive, maintain, transmit, and/or otherwise manage data representative of additional content associated with an e-Book. For example, management subsystem 202 may be configured to receive data representative of additional content from first e-Book reader device 204-1 and/or transmit the data representative of the additional content to second e-Book reader device 204-2, as will be explained in more detail below. Management subsystem 202 may be configured to transmit data representative of additional content to e-Book reader devices at any suitable time and/or in any suitable manner. For example, management subsystem 202 may be configured to transmit data representative of additional content and/or corresponding updates to e-Book reader devices 204 in response to receiving a corresponding request from e-Book reader devices 204, in response to receiving the data representative of the additional content and/or corresponding updates, at a predetermined (e.g., predefined or user-defined) frequency (e.g., hourly, daily, etc.), in response to detecting a communicative connection with e-Book reader devices 204, based on presence information indicating users are logged in or otherwise connected to management subsystem 202, in accordance with a download of a corresponding e-Book, at any other suitable time, and/or in any other suitable manner.

In some examples, management subsystem 202 may be configured to dynamically monitor for updates to additional content (e.g., "deltas" to additional content) and/or notify corresponding e-Book reader devices when updates are available. For example, a particular e-Book reader device (e.g., second e-Book reader device 204-2) may request, register for, and/or subscribe to update notifications corresponding to additional content that the e-Book reader device has previously accessed/received. Accordingly, management subsystem 202 may be configured to detect one or more updates to the additional content and/or provide corresponding update notifications to the e-Book reader device (e.g., in accordance with the request, registration, and/or subscription of the e-Book reader device) to inform the e-Book reader device and/or a corresponding user that the updates and/or corresponding updated versions of the additional content are now available. If desired, the e-Book reader device may thereafter request the updates (e.g., in response to an update notification or to user input) from management subsystem 202, and management subsystem 202 may transmit data representative of the updates to the e-Book reader device for presentation to the user. Management subsystem 202 may be further configured to track what updates and/or versions of additional content have been received/accessed by corresponding e-Book reader devices. Accordingly, management subsystem 202 may transmit only data representative of an update (e.g., a "delta" in the additional content), which may help conserve communication resources. In additional or alternative examples, management subsystem 202 may be configured to notify e-Book reader devices 204 of additional content updates, transmit data representative of additional content updates to e-Book reader devices 204, and/or otherwise manage additional content updates in any other suitable manner as may serve a particular implementation.

Management subsystem 202 may be additionally or alternatively configured to selectively distribute data representative of additional content in accordance with one or more custom parameters associated with a particular user and/or a particular instance of additional content. For example, management subsystem 202 may be configured to distribute additional content to e-Book reader devices 204 in accordance with one or more user profiles (e.g., maintained by management subsystem 202 and/or e-Book reader devices 204, and/or associated with users 206), one or more user-configurable parameters associated with a particular instance of additional content (e.g., configured to control who receives the particular instance of additional content), one or more user-configurable parameters (e.g., filtering preferences) associated with and/or received from e-Book reader devices 204 (e.g., configured to filter/control what additional content is delivered to each of e-Book reader devices 204), and/or in accordance with any other suitable custom parameters. Accordingly, management subsystem 202 may deliver customized sets of additional content to each of e-Book reader devices 204 in accordance with the corresponding custom parameters.

As shown in FIG. 2, e-Book reader devices 204 may be configured to maintain an e-Book 210 (e.g., in the form of data representative of the e-Book and/or remote access to data representative of the e-Book). For example, e-Book reader devices 204 may both maintain e-Book 210. Accordingly, users 206 may both have access to the same e-Book by way of e-Book reader devices 204. E-Book reader devices 204 may be further configured to facilitate the creation of additional content (e.g., to be associated with a particular passage of e-Book 210) by a user, the submission of additional content to management subsystem 202, the receipt of additional content from management subsystem 202, the presentation of additional content for experiencing (e.g., viewing, reading, etc.) by a user, and/or any other suitable process or operation associated with additional content. As used herein, the term "presenting additional content" and variations thereof may include, but are not limited to, displaying, playing, or otherwise presenting the additional content or one or more components of the additional content, such that the additional content may be experienced by the user.

In certain embodiments, system 100 may be implemented entirely by or within management subsystem 202 or e-Book reader devices 204. In other embodiments, components of system 100 may be distributed across management subsystem 202 and e-Book reader devices 204. In some examples, e-Book reader devices 204 may include a client (e.g., a client application) implementing one or more of the facilities of system 100.

Management subsystem 202 may be implemented by one or more computing devices. For example, management subsystem 202 may be implemented by one or more server devices. Additionally or alternatively, e-Book reader devices 204 may include any suitable e-Book reader devices, such as disclosed herein.

Figure 3:
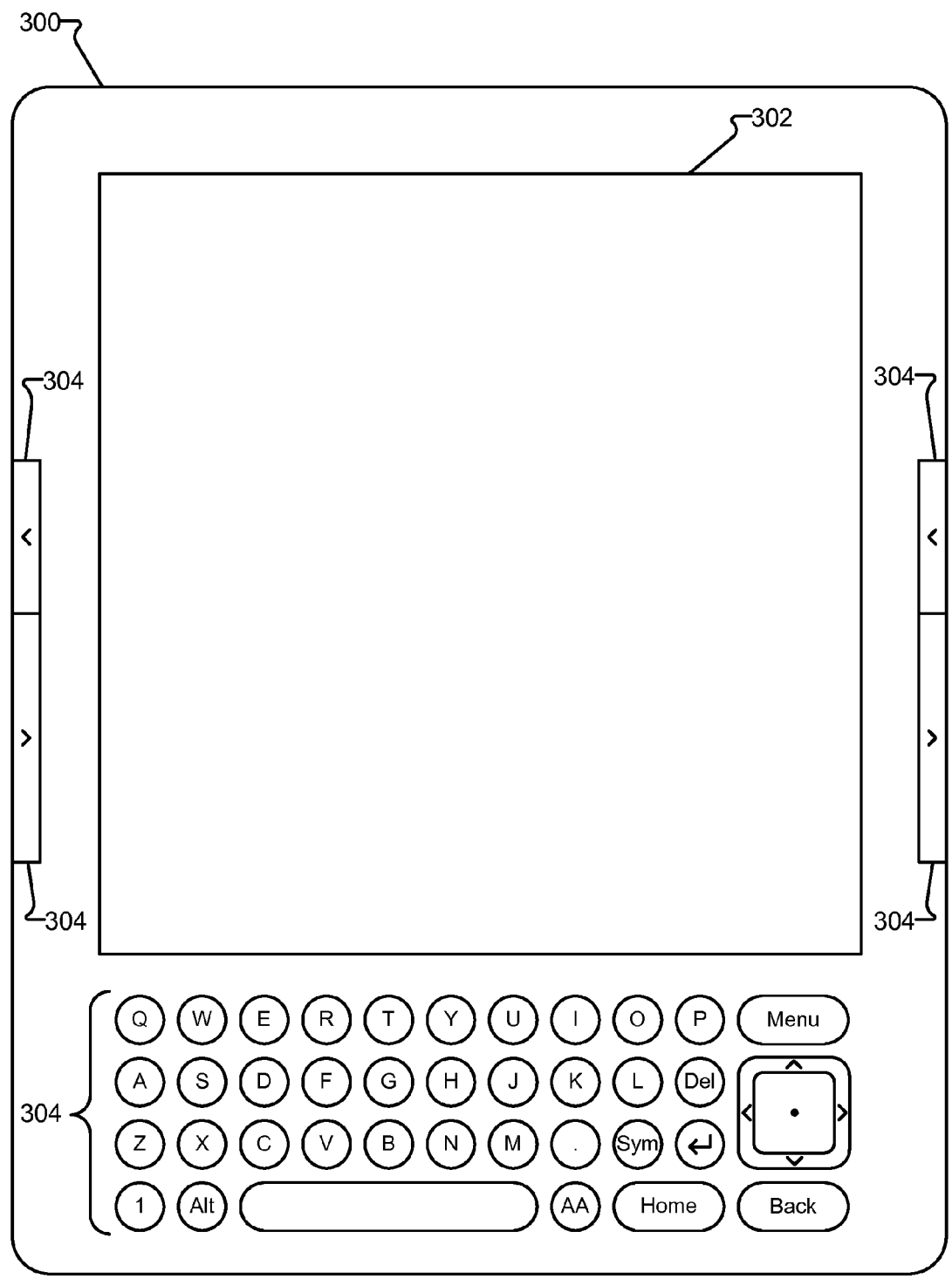
FIG. 3 illustrates an exemplary e-Book reader device according to principles described herein.

To illustrate, FIG. 3 shows an exemplary e-Book reader device 300 that may be implemented by e-Book reader devices 204. As shown, e-Book reader device 300 may include a display screen 302 and/or one or more input buttons 304. In some examples, e-Book reader device 300 may be configured to present (e.g., display) text, images, and/or other content from an e-Book by way of display screen 302. E-Book reader device 300 may additionally or alternatively present additional content associated with an e-Book, one or more selectable options associated with an e-Book and/or corresponding additional content, and/or any other suitable content, information, and/or options as may serve a particular implementation. In some examples, display screen 302 may be a touch screen by way of which a user may provide user input to interact with display screen 302, content displayed on display screen 302, options displayed on display screen 302, and/or by way of which a user may interact with e-Book reader device 300 in any other suitable manner.

Input buttons 304 may be configured to allow a user to interact with e-Book reader device 300, one or more e-Books, and/or additional content in any suitable manner. For example, input buttons 304 may be configured to allow a user to access and/or experience the content of an e-Book, navigate within an e-Book, interact with the content of an e-Book, provide additional content, access additional content, interact with additional content, and/or perform any other suitable operation associated with e-Book reader device 300. To illustrate, a user may utilize buttons 304 to navigate to a particular passage of an e-Book, select and/or highlight the particular passage, generate additional content to be associated with the particular passage, and/or access additional content already associated with the particular passage, as will be explained in more detail below.

E-Book reader device 300 is provided for illustrative purposes only and is not limiting. In additional or alternative examples, the systems and methods disclosed herein may be implemented by and/or performed in accordance with any other suitable e-Book reader devices, as may serve a particular implementation.

Figure 4:
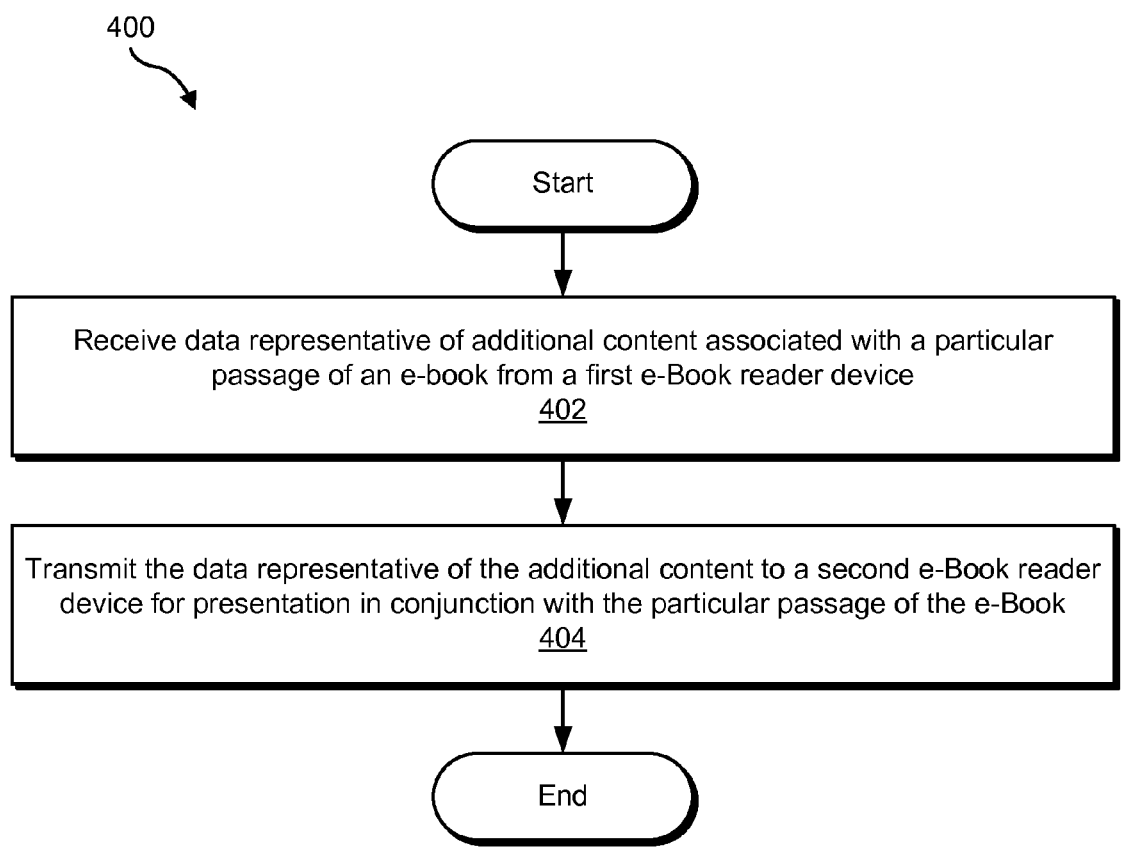
FIG. 4 illustrates an exemplary method of managing content associated with a particular passage of an e-Book according to principles described herein.

FIG. 4 illustrates an exemplary method 400 of managing content associated with a particular passage of an e-Book. While FIG. 4 illustrates exemplary steps according to one embodiment, other embodiments may omit, add to, reorder, and/or modify any of the steps shown in FIG. 4. One or more of the steps shown in FIG. 4 may be performed by any component or combination of components of system 100.

In step 402, a content management subsystem receives data representative of additional content associated with a particular passage of an e-Book from a first e-reader device. For example, management subsystem 202 may receive the data representative of the additional content in any suitable manner, such as described herein. To illustrate, management subsystem 202 may receive data representative of the additional content from first e-Book reader device 204-1 associated with a particular passage of e-Book 210.

In step 404, the content management subsystem transmits the data representative of the additional content to a second e-Book reader device for presentation in conjunction with the particular passage of the e-Book. For example, management subsystem 202 may transmit the data representative of the additional content to the second e-Book reader device, which may be configured to present the additional content in conjunction with the particular passage of the e-Book in any suitable manner, such as described herein. To illustrate, management subsystem 202 may transmit data representative of the additional content to second e-Book reader device 204-2, which may present the additional content in conjunction with the particular passage of e-Book 210.

To further illustrate the foregoing, FIGS. 5-9 illustrate one example by way of which a user may generate and/or provide additional content associated with a particular passage of an e-Book. In particular, FIGS. 5-9 illustrate successive views of an e-Book reader device 500 being used to generate additional content associated with a particular passage from an e-Book titled "The Count of Monte Cristo." In some examples, e-Book reader device 500 may implement one or more features of e-Book reader device 300, may be implemented by first e-Book reader device 204-1, and/or may be used by first user 206-1.

Figure 5:
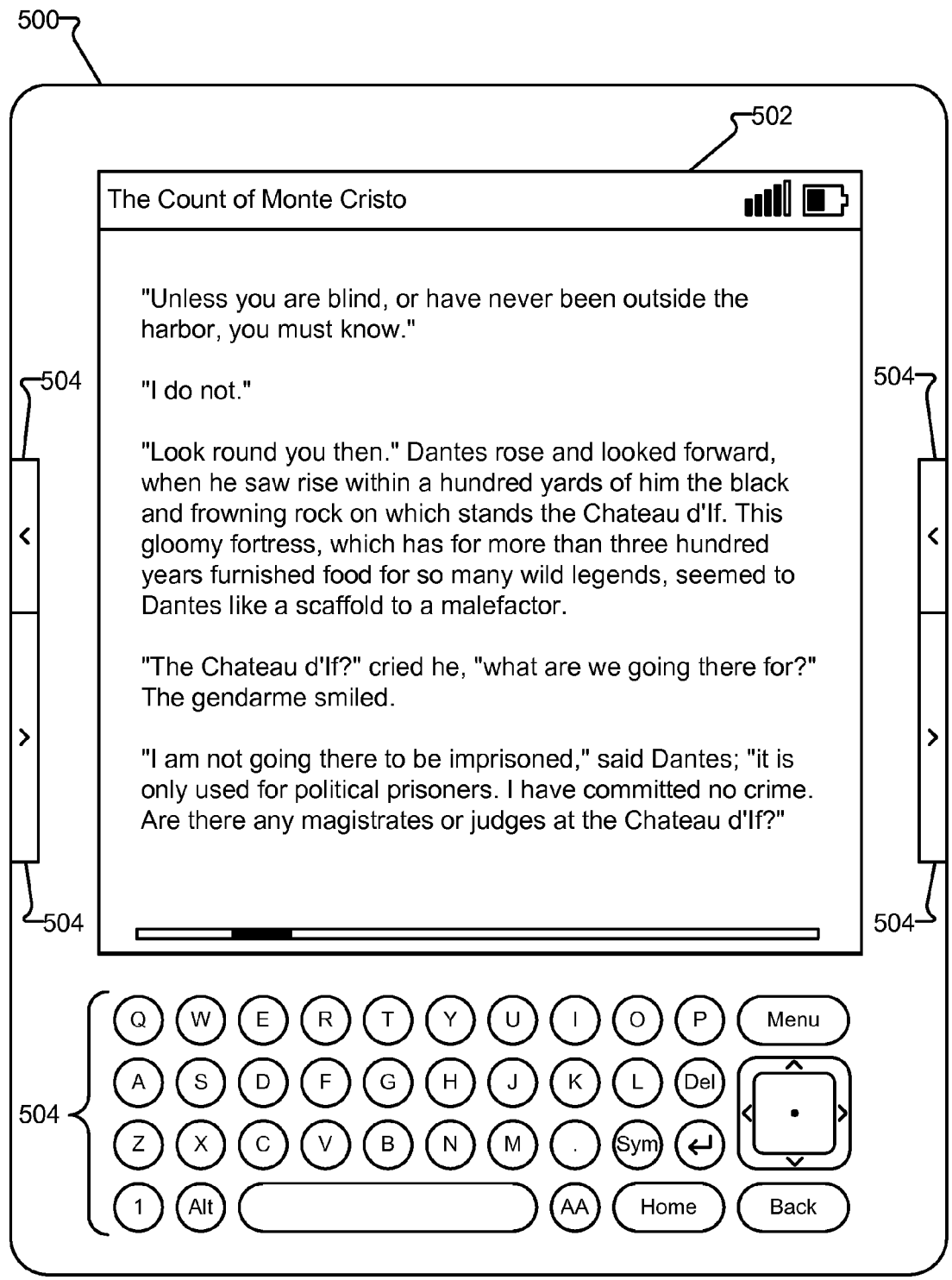
FIGS. 5-9 illustrate exemplary views of an e-Book reader device by way of which a first user provides additional content associated with a particular passage of an e-Book according to principles described herein.

As shown in FIG. 5, e-Book reader device 500 may present an e-Book for experiencing by a user. For example, e-Book reader device 500 may display content (e.g., text and/or images) from the e-Book by way of a display screen 502. E-Book reader device 500 may also include one or more input buttons 504 by way of which a user may navigate and/or interact with the e-Book. For example, the user may utilize input buttons 504 to navigate from one page of the e-Book to another as the user reads the e-Book, to interact with (e.g., select/highlight) the text of the e-Book displayed on display screen 502, and/or interact with any other information and/or options displayed on display screen 502, as will be explained in more detail below.

Figure 6:
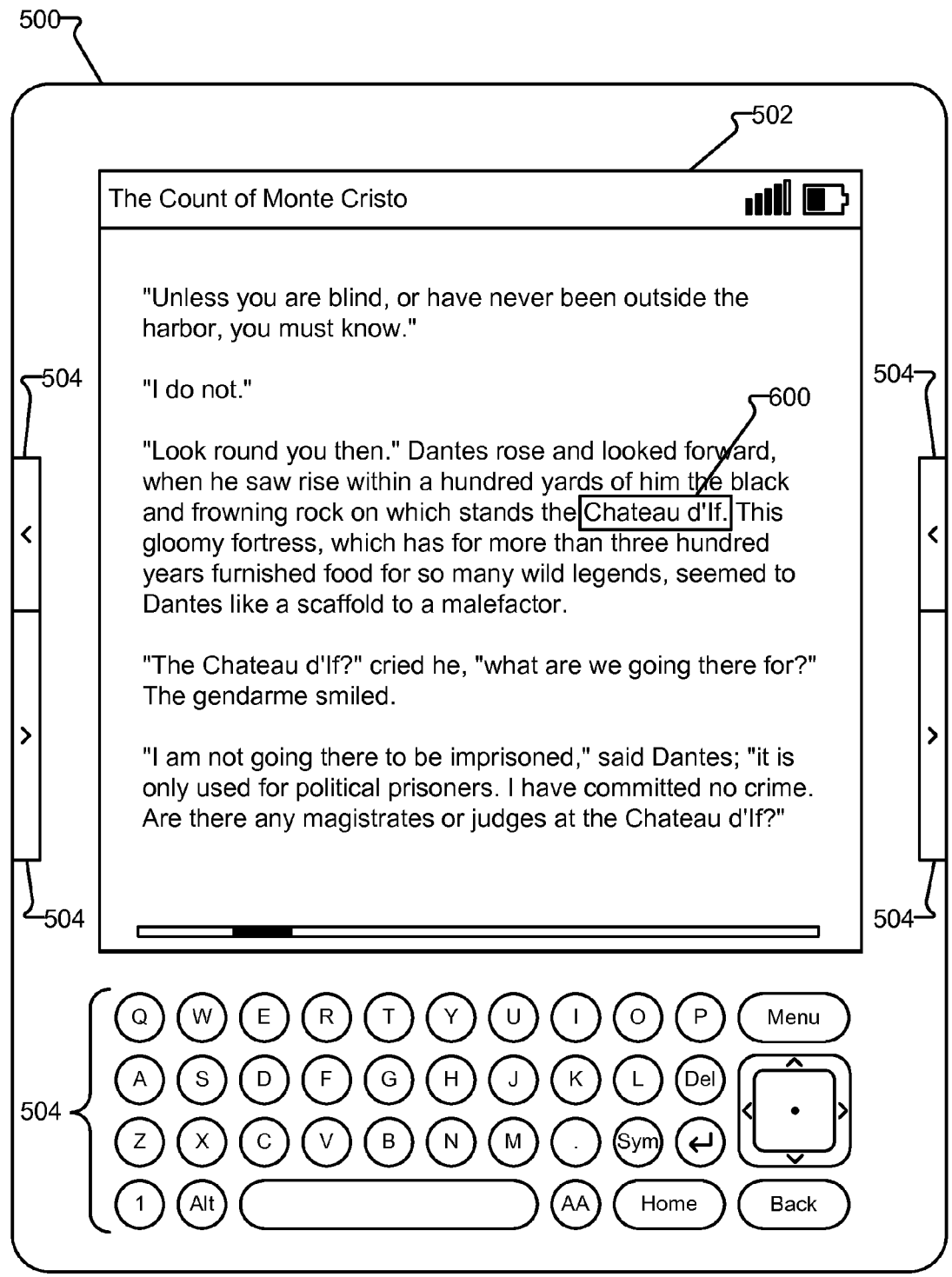

To illustrate, as shown in FIG. 6, a user may select (e.g., highlight) a particular passage displayed on display screen 502 as represented by selection box 600. For example, the user may select the passage "Chateau d'If," as shown in FIG. 6. Although FIG. 6 shows the user having selected the passage "Chateau d'If," in additional or alternative examples, a user may select any other particular passage of the e-Book.

Figure 7:
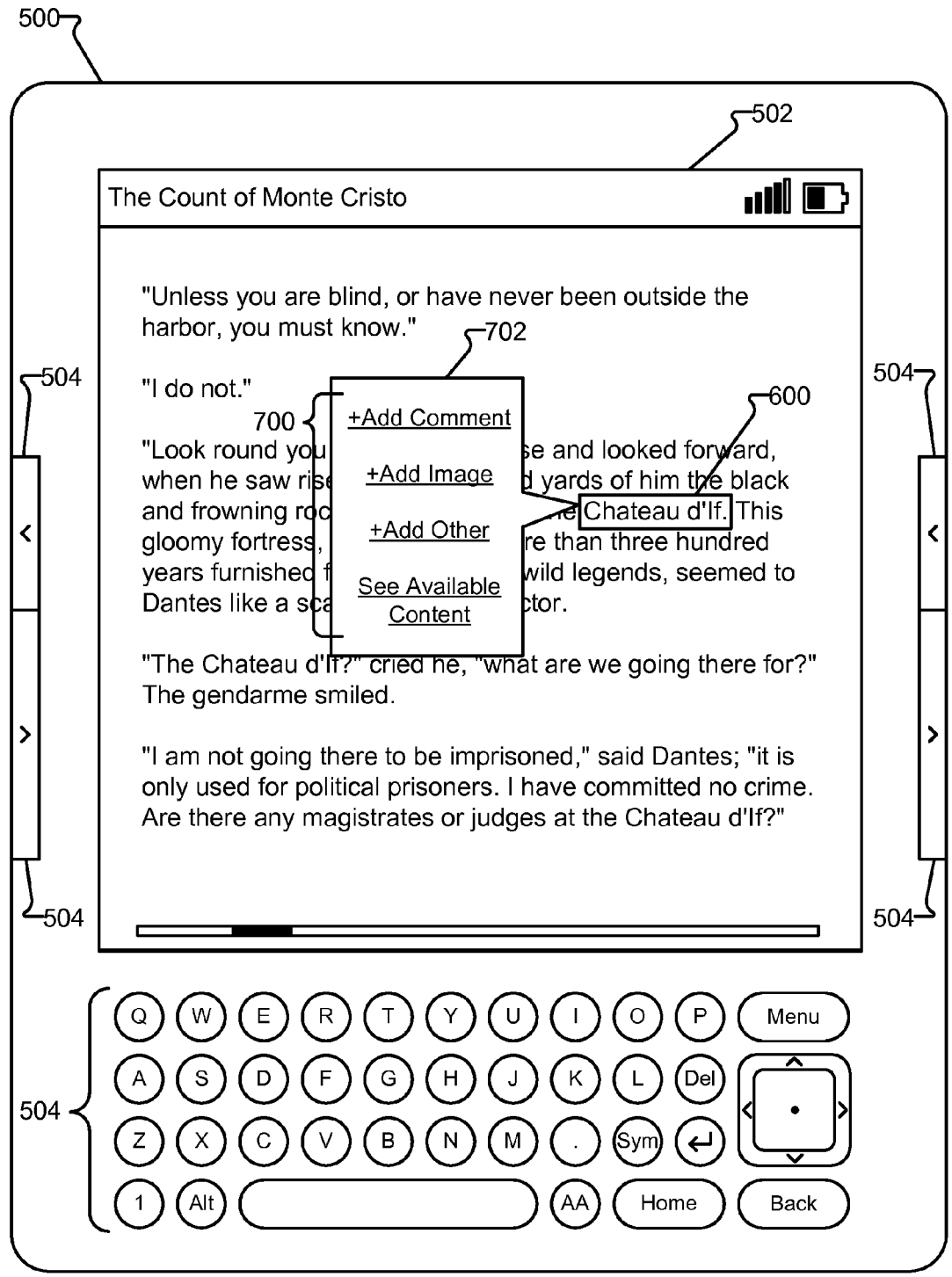

As shown in FIG. 7, e-Book reader device 500 may display (e.g., in response to the user's selection of the particular passage) one or more selectable options 700 associated with the selected passage. In some examples, selectable options 700 may be configured to facilitate the generation and/or access of additional content associated with the selected passage. For example, selectable options 700 may be configured to allow a user to "Add Comment" (e.g., add a comment to be associated with the selected passage), "Add Image" (e.g., add an image to be associated with the selected passage), "Add Other" (e.g., add any other additional content to be associated with the selected passage), and/or "See Available Content" associated with the selected passage. In further implementations, e-Book reader device 500 may display any additional and/or alternative selectable options associated with a particular passage and/or corresponding additional content.

As shown in FIG. 7, selectable options 700 may be presented within a window 702. For example, in response to the selection of the particular passage and/or in response to a corresponding user request, e-Book reader device 500 may display window 702 and/or selectable options 700 on display screen 502. In some examples, window 702 and/or selectable options 700 may be at least partially overlaid on the e-Book and/or the selected passage. In additional or alternative examples, selectable options 700 may be presented in any other suitable manner as may serve a particular implementation.

A user may select one or more of selectable options 700 to generate and/or access additional content associated with the selected passage or any portion thereof. To illustrate, a user may select the "Add Comment" option to provide a comment to be associated with the selected passage. In response to the selection of the "Add Comment" option, e-Book reader device 500 may display one or more options (e.g., form-fillable options, selectable options, etc.), interfaces, and/or windows configured to facilitate the generation of a comment by the user.

Figure 8:
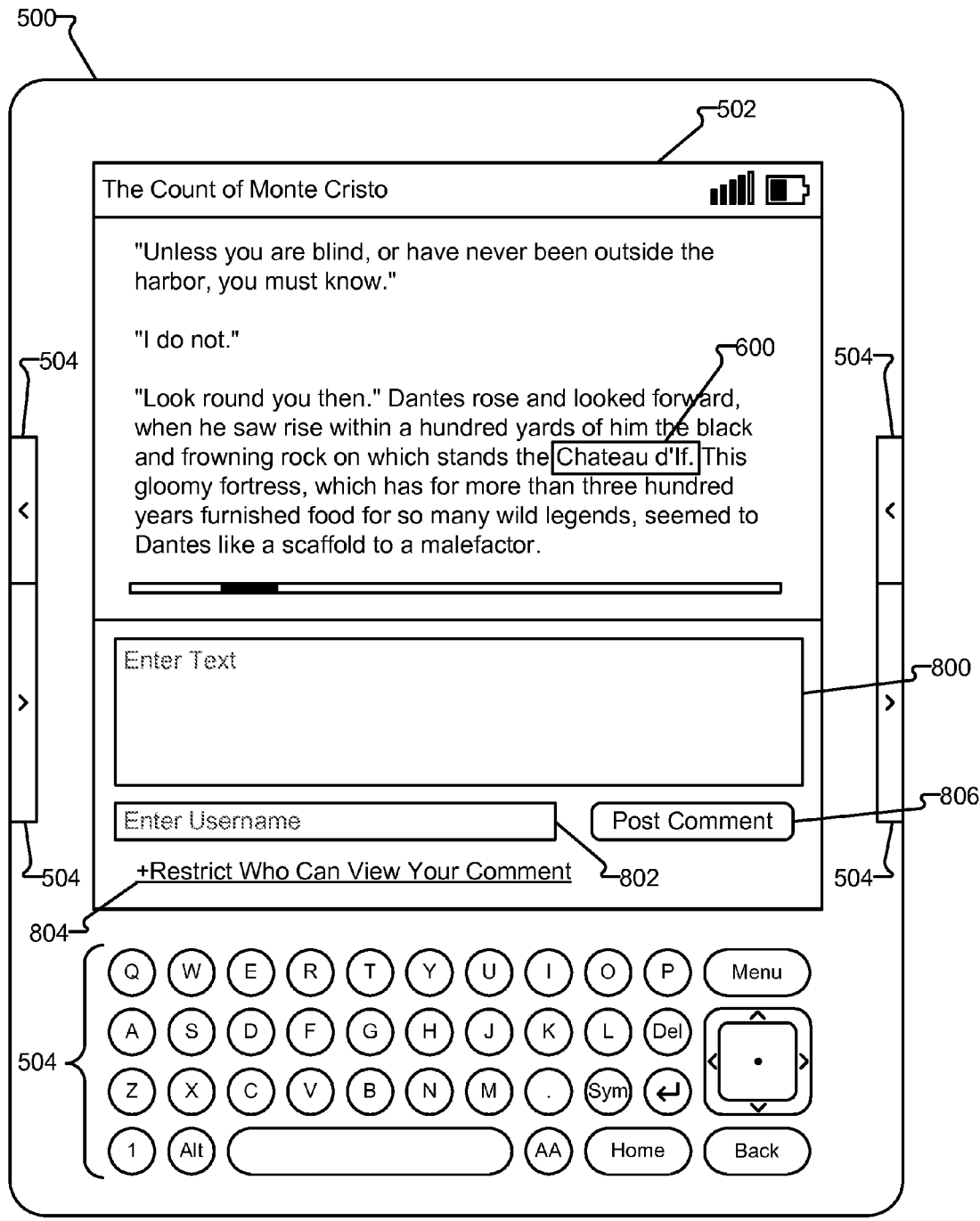

For example, as shown in FIG. 8, e-Book reader device 500 may display (e.g., by way of display screen 502) a first form-fillable option 800 by way of which a user may input a comment to be associated with the selected passage and a second form-fillable option 802 by way of which the user may input a username to be associated with the comment. In some examples, a user may be required to input a password associated with an inputted username. As further shown in FIG. 8, e-Book reader device 500 may display a first selectable option 804 configured to allow the user to control and/or restrict the distribution of the user's comment and a second selectable option 806 configured to allow the user to "Post" an inputted comment.

Figure 9:
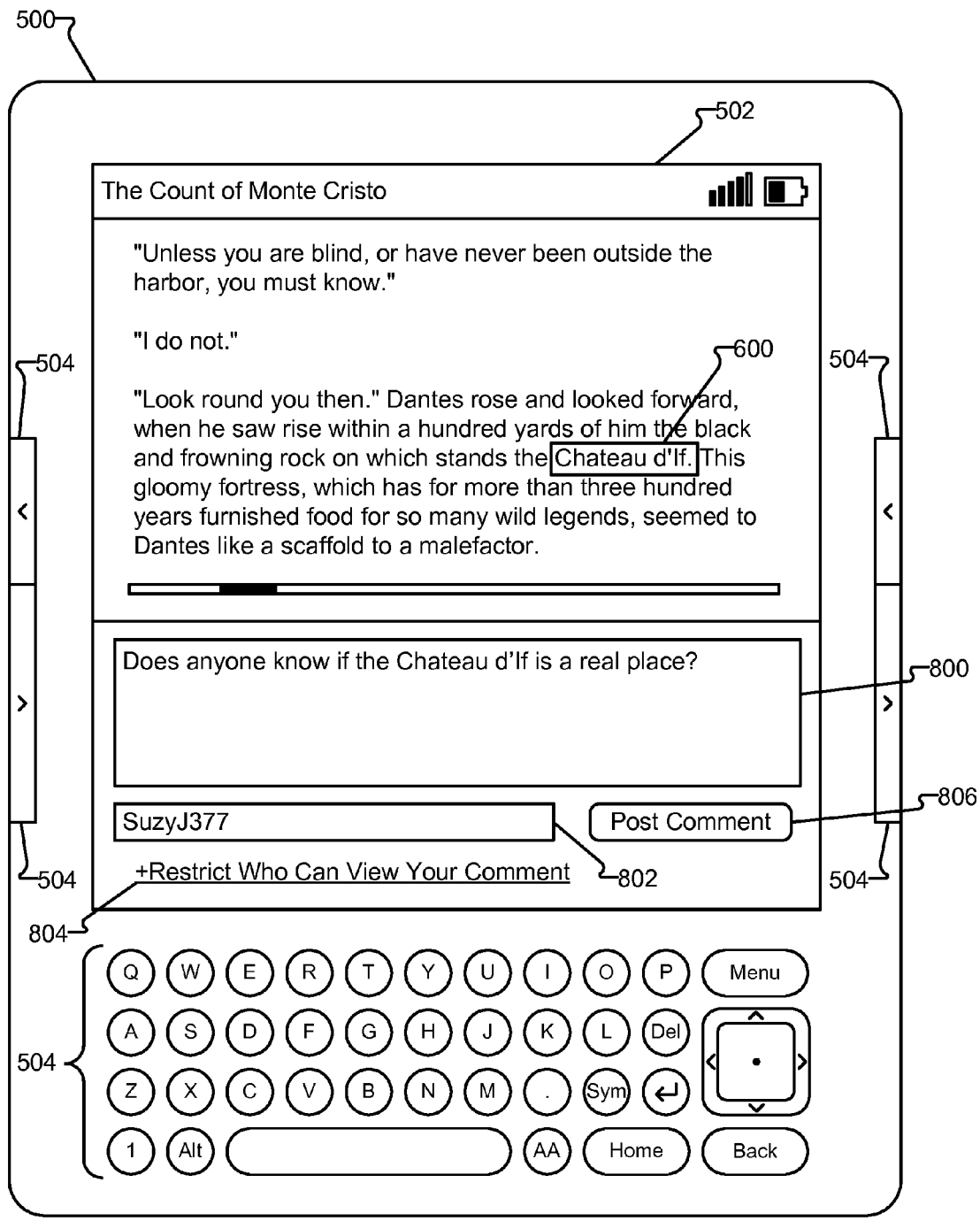

To illustrate the foregoing, and as shown in FIG. 9, a user may utilize option 800 and buttons 504 to input the following comment: "Does anyone know if the Chateau d'If is a real place?" (e.g., to solicit additional information from other users regarding a place mentioned in the e-Book). The user may then utilize option 802 and buttons 504 to input the username "SuzyJ377", select option 804 to manage the distribution of the inputted comment, and/or select option 806 to post the inputted comment.

In response to selecting option 804, the user may be allowed to provide one or more user-configurable parameters configured to govern the distribution of the user's comment. In some examples, the user may designate one or more specific recipients (e.g., friends, colleagues, family members, book club members, classmates, social media contacts, employees, subscribers, and/or any other suitable recipients) and/or groups of recipients (e.g., book clubs, classes, contact lists, organizations, and/or any other suitable groups of recipients). Additionally or alternatively, the user may be allowed to govern the distribution of the comment in any other suitable manner. For example, the user may restrict the distribution of the comment to a particular geographic area, recipients of a particular age group, recipients that speak a particular language, a particular time period, and/or based on any other suitable restriction. The selective distribution of additional content may be managed by management facility 102.

To illustrate the foregoing, a user may utilize option 804 to restrict the distribution of a comment or other additional content to members of the user's book club. In response, the members of the book club may utilize corresponding e-Book reader devices to access and/or respond to the comment posted by the user. Accordingly, the members of the book club may conveniently communicate with each other regarding particular passages within an e-Book without having to meet in person and without making the communications publicly available.

In some examples, the distribution of additional content may be in accordance with one or more subscriptions and/or micropayments. For example, a user may restrict distribution of a comment to only those who subscribe and/or pay for access to the comment. To illustrate, a particular student may utilize an e-Book reader device to provide notes and explanations associated with particular passages of a textbook or other educational publication. The student may then make the notes/explanations available to other students in exchange for corresponding micropayments. By so doing, the originating student may generate revenue based on his/her insight and educational reputation while other students may pay to gain additional insight and understanding that they may not have been able to acquire on their own. In additional or alternative examples, the subscribing/paying students may rate the originating student and/or corresponding notes to provide information to other students regarding the value of the notes and/or the abilities of the originating student.

Once a user has inputted a comment, inputted a username, and inputted user-configurable parameters to control the distribution of the comment (if desired), the user may select option 806 to post the comment (e.g., to transmit data representative of the comment to management subsystem 202 and/or make the comment available to other e-Book reader devices).

FIGS. 5-9 are provided for illustrative purposes only and are not limiting. In additional or alternative examples, the process of submitting additional content, the additional content itself, the options presented to a user, and/or the steps taken by a user may be omitted, added to, reordered, and/or modified in any suitable manner as may serve a particular implementation.

For example, although FIGS. 5-9 illustrate a comment, any other suitable additional content may be provided by way of e-Book reader device 500.

For example, a user may provide one or more illustrations, photographs, citations (e.g., citations to/from another publication), hyperlinks (e.g., hyperlinks to one or more news articles, additional e-Books, internet forums, promotions, web-pages, etc.), and/or any other suitable additional content associated with a particular passage.

Additionally or alternatively, although the exemplary comment illustrated in FIGS. 5-9 is configured as an inquiry for more information regarding something mentioned in the selected passage, a comment may be configured for any other suitable purpose. For example, a comment may be configured to inquire regarding additional passages and/or corresponding e-Books associated with the particular passage, and/or to provide recommendations regarding additional e-Books written about a particular subject, person, place, etc. mentioned in the particular passage. To illustrate, a user may provide a comment requesting, and other users may provide one or more replies including information regarding additional books that have passages similar to the particular passage, provide additional information about a subject mentioned in the particular passage, and/or refer (e.g., cite) to the particular passage. In additional or alternative examples, a comment may be configured to provide additional information from a user regarding a particular passage. To illustrate, a user may provide a comment to provide the user's interpretation of, explanation of, personal experience associated with, notes associated with, and/or personal insight regarding a particular passage. In other examples, a comment may be configured in any other suitable manner and/or for any other suitable purpose.

Although FIGS. 5-9 illustrate the provision of additional content to be associated with a novel, the methods and systems disclosed herein may be employed in association with any other suitable type of publication in e-Book format. For example, the methods and systems disclosed herein may be employed in accordance with one or more other fictional literary works (e.g., short stories, fables, fairy tales, plays, poetry, comic books, etc.), non-fictional literary works (e.g., biographies, histories, etc.), educational publications (e.g., textbooks, dictionaries, almanacs, encyclopedias, essays, treatises, etc.), communications (e.g., letters, etc.), personal records (e.g., diaries, travelogues, memoirs, etc.), technical documents (e.g., scientific papers, diagrams, design documents, blueprints, user manuals, etc.), magazines, newspapers, newsletters, journals, and/or any other suitable type of e-Book.

Figure 10:
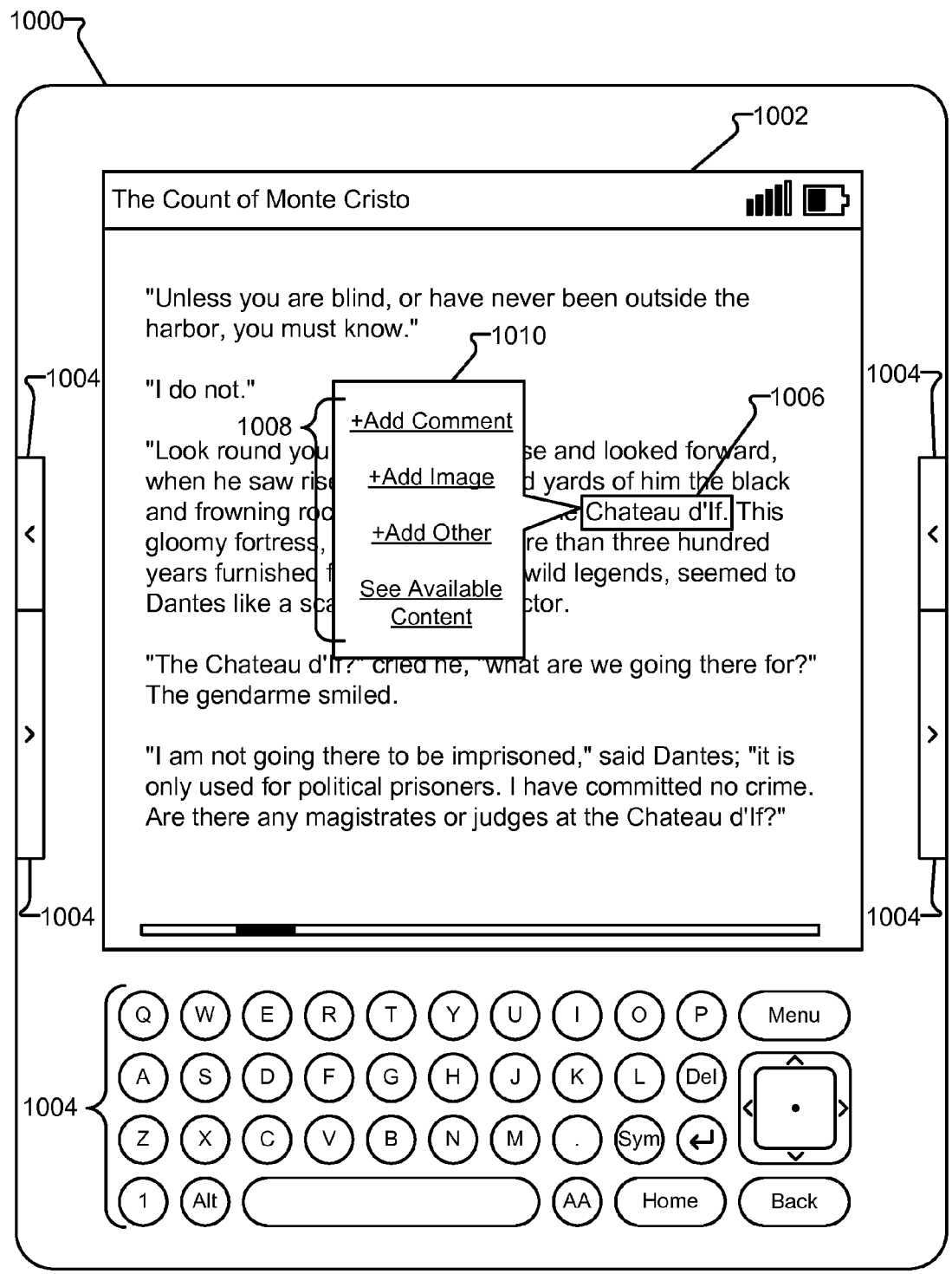
FIGS. 10-12 illustrate exemplary views of another e-Book reader device by way of which a second user accesses additional content associated with a particular passage of an e-Book according to principles described herein.
Figure 11:
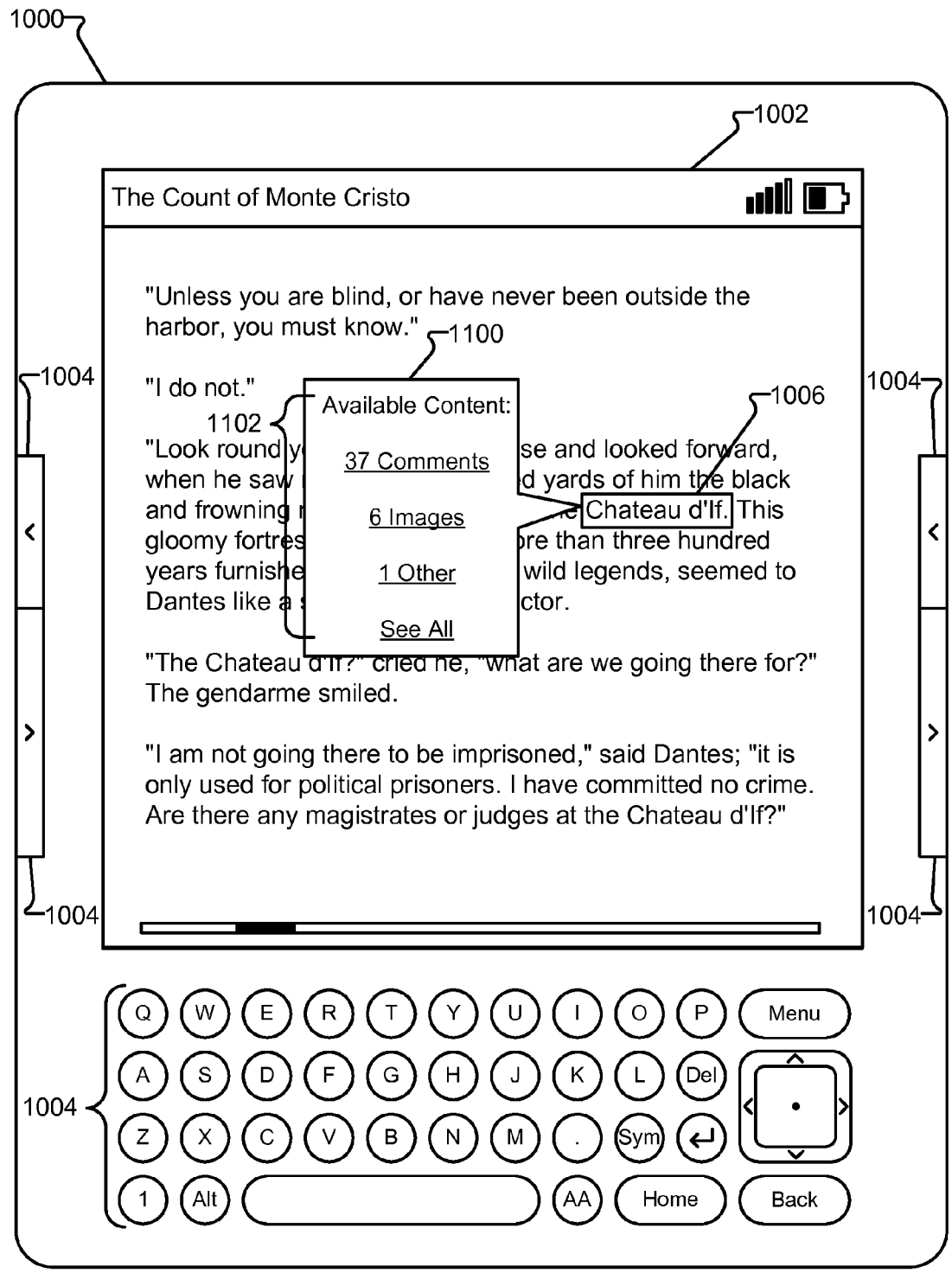
Figure 12:
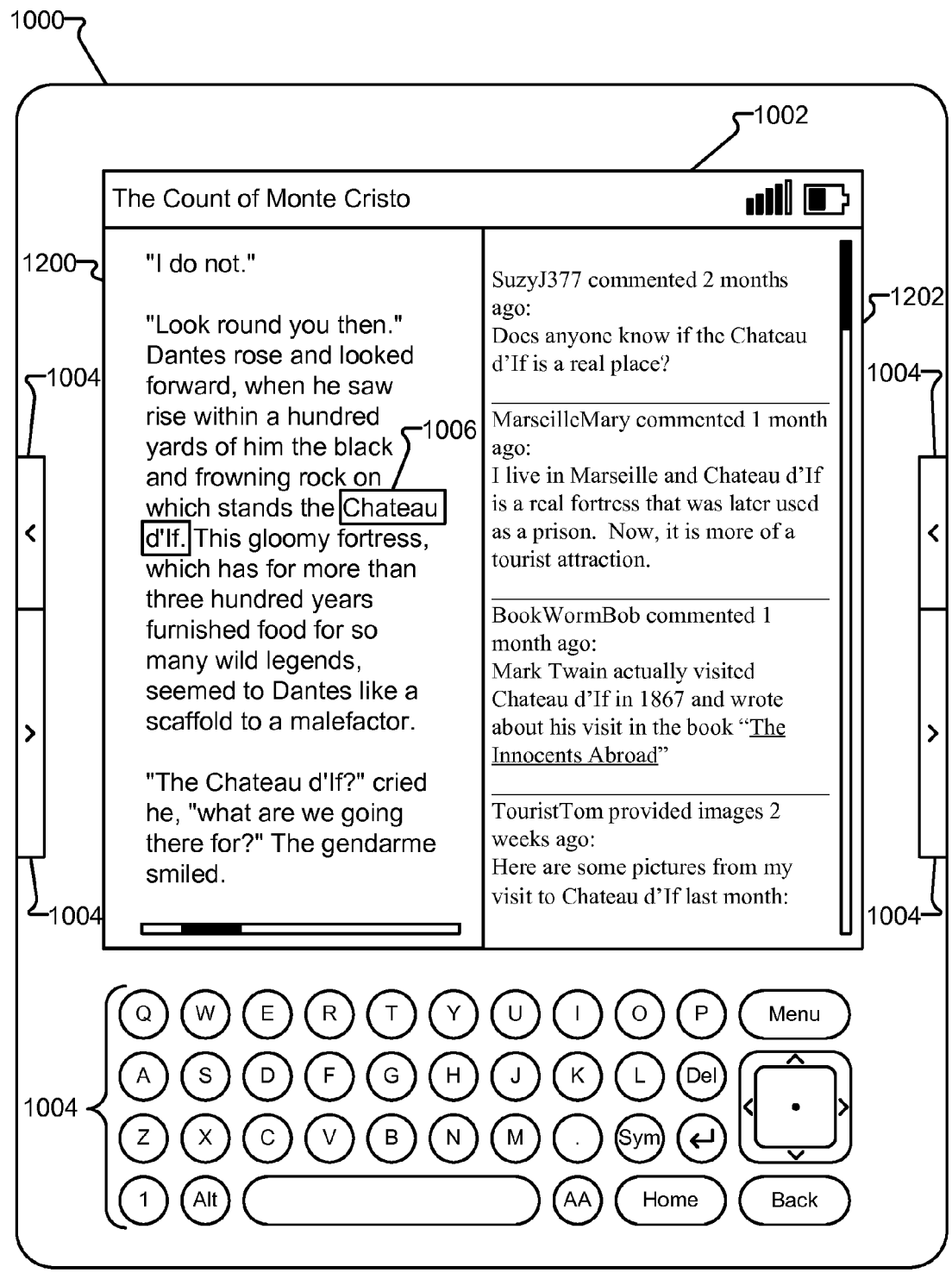

FIGS. 10-12 illustrate an exemplary process of accessing additional content associated with a particular passage of an e-Book. In particular, FIGS. 10-12 illustrate successive views of another e-Book reader device 1000 being used to access additional content associated with the same passage ("Chateau d'If") from the same e-Book ("The Count of Monte Cristo") illustrated in FIGS. 5-9. In some examples, e-Book reader device 1000 may include a display screen 1002, may include one or more input buttons 1004, may implement one or more features of e-Book reader device 300, may be implemented by second e-Book reader device 204-2, and/or may be used by second user 206-2.

As shown in FIG. 10, a user may utilize e-Book reader device 1000 to experience the e-Book titled "The Count of Monte Cristo." In doing so, the reader may wish to access additional content associated with a particular passage of the e-Book. For example, the user may be interested in accessing additional content associated with a passage referencing the "Chateau d'If." To do so, the user may select/highlight the particular passage, as represented by selection box 1006. Although FIG. 10 illustrates the user selecting the exact same passage as selected in FIGS. 5-9, the user may alternatively select any suitable passage including at least a portion of the passage selected in FIGS. 5-9 to access the corresponding additional content (e.g., the user may select the entire sentence, paragraph, or page including the passage to access additional content associated with the passage as well as additional content associated with other passages included within the selection).

As shown in FIG. 10, the user may be presented with one or more selectable options 1008 (e.g., within a window 1010) configured to allow the user to provide and/or access additional content associated with the selected passage. Options 1008 and/or window 1010 may be similar to options 700 and/or window 702 illustrated in FIG. 7 and explained in more detail above.

To see available additional content associated with the selected passage, the user may select the "See Available Content" option from options 1008. In response to the user's selection, and as shown in FIG. 11, e-Book reader device 1000 may present an additional window 1100 including information and/or one or more additional selectable options 1102 associated with corresponding additional content. As shown in FIG. 11, a user may selectively utilize options 1102 to access "37 Comments" associated with the selected passage, "6 Images" associated with the selected passage, "1 Other" type of additional content associated with the selected passage, and/or "See All" additional content associated with the particular passage.

In response to a user selection of the "See All" option within selectable options 1102, e-Book reader device 1000 may be configured to present all the available additional content associated with the selected passage. For example, as shown in FIG. 12, e-Book reader device 1000 may present a split-screen display by way of display screen 1002. The split-screen display may include a first viewing pane 1200 by way of which a user can view and navigate the e-Book and a second viewing pane 1202 by way of which the user can view, scroll through, read, and/or otherwise experience the additional content. As a result, a user may simultaneously utilize first viewing pane 1200 to read the e-Book and second viewing pane 1202 to access additional content associated with the e-Book.

As shown in FIG. 12, the additional content presented within second viewing pane 1202 includes the comment provided by "SuzyJ377" as illustrated in FIGS. 5-9 and explained in more detail above. As further shown in FIG. 12, the additional content presented within second viewing pane 1202 may include one or more responses to the original comment, one or more citations to related publications, and/or one or more images associated the selected passage. In additional or alternative examples, second viewing pane 1202 may include any other suitable additional content as may serve a particular implementation.

FIGS. 10-12 are provided for illustrative purposes only and are not limiting. In additional or alternative examples, the process of presenting additional content to a user, the additional content presented to the user, the options presented to a user, and/or the steps taken by a user to access additional content may be omitted, added to, reordered, and/or modified in any suitable manner as may serve a particular implementation.

For example, although FIGS. 10-12 illustrate steps by way of which a user may manually access additional content associated with a particular passage of an e-Book, in additional or alternative examples, the access of additional content may be at least partially automated. To illustrate, as a user navigates from one page or paragraph to another, information associated with additional content corresponding to an active page or paragraph may be automatically presented to the user.

Figure 13:
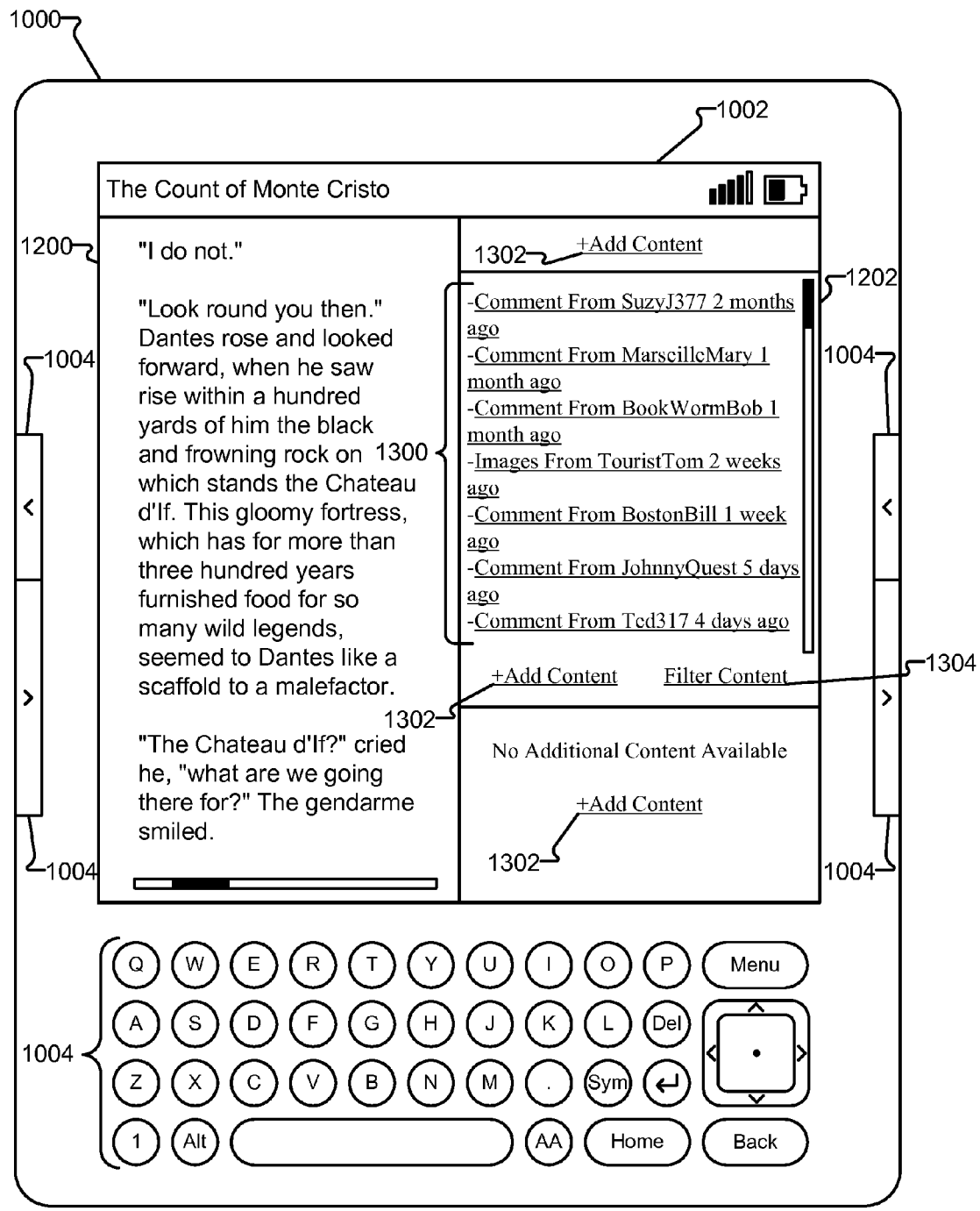
FIG. 13 illustrates another view of the e-Book reader device of FIGS. 10-12 by way of which the user accesses additional content associated with a particular passage of an e-Book in an alternative manner according to principles described herein.

For example, as shown in FIG. 13, e-Book reader device 1000 may utilize the split-screen display illustrated in FIG. 12 to automatically present additional content as a user reads the e-Book (e.g., and without the user selecting a particular passage or a corresponding option to request the additional content). To illustrate, in conjunction with the user's navigation of the e-Book by way of first viewing pane 1200, e-Book reader device 1000 may automatically present, by way of second viewing pane 1202, additional content and/or corresponding selectable options associated with a corresponding portion of the e-Book displayed within first viewing pane 1200.

For example, e-Book reader device 1000 may automatically display, within second viewing pane 1202, one or more additional content hyperlinks 1300 (e.g., configured to allow a user to access corresponding additional content) in conjunction with a corresponding paragraph displayed within first viewing pane 1200. In some examples, hyperlinks 1300 may link to additional content associated with particular passages included within the corresponding paragraph of the e-Book. Although hyperlinks 1300 are shown in FIG. 13 as being grouped in accordance with corresponding paragraphs of the e-Book displayed in first viewing pane 1200, hyperlinks 1300 may additionally or alternatively be grouped, organized, and/or separated in accordance with corresponding lines, sentences, and/or words displayed within first viewing pane 1200.

As further shown in FIG. 13, second viewing pane 1202 may include one or more selectable options corresponding to each paragraph of the e-Book displayed within first viewing pane 1200. For example, second viewing pane 1202 may include a selectable option 1302 corresponding to each displayed paragraph and configured to allow a user to "Add Content" to be associated with the corresponding paragraphs of the e-Book.

As mentioned above and as shown in FIG. 13, e-Book reader device may display one or more selectable options 1304 configured to allow a user to filter what additional content is displayed and/or made available to the user. For example, a user may utilize selectable option 1304 to provide one or more user-configurable parameters to manage, restrict, and/or otherwise control the presentation of the additional content. To illustrate, the user may utilize selectable option 1304 to restrict the display of additional content to additional content associated with one or more specified providers (e.g., users) of additional content, one or more specified groups of users (e.g., a book club), one or more specified types of additional content, one or more specified time periods (e.g., to control the age of additional content displayed), one or more specified portions of the e-Book, and/or any other suitable specified parameters. Thereafter, e-Book reader device 1000 may display additional content in accordance with the specified parameters provided by the user.

In some examples, e-Book reader device 1000 may dynamically reformat the presentation of an e-Book to facilitate the concurrent presentation of corresponding additional content. For example, e-Book reader device 1000 may reformat a presentation of a portion of an e-Book to concurrently present one or more images (e.g., user illustrations or user photographs) associated with the portion of the e-Book (e.g., associated with a particular passage included in the portion of the e-Book). To illustrate, e-Book reader device 1000 may automatically inlay a particular user illustration into the presentation of a corresponding portion an e-Book (e.g., as if the user illustration was a part of the e-Book itself). By so doing, e-Book reader device 1000 may automatically illustrate an e-Book that was not previously illustrated using additional content provided by one or more users. In some examples, e-Book reader device 1000 may be configured to automatically illustrate an e-Book in accordance with one or more particular illustrations and/or providers of illustrations (e.g., users) that have been specifically selected by a user, ranked by a user, flagged by a user, and/or otherwise designated by the user in any suitable manner. In additional or alternative examples, e-Book reader device 1000 may be configured to automatically reformat the presentation of an e-Book and/or incorporate the presentation of corresponding additional content in any other suitable manner.

Figure 14:
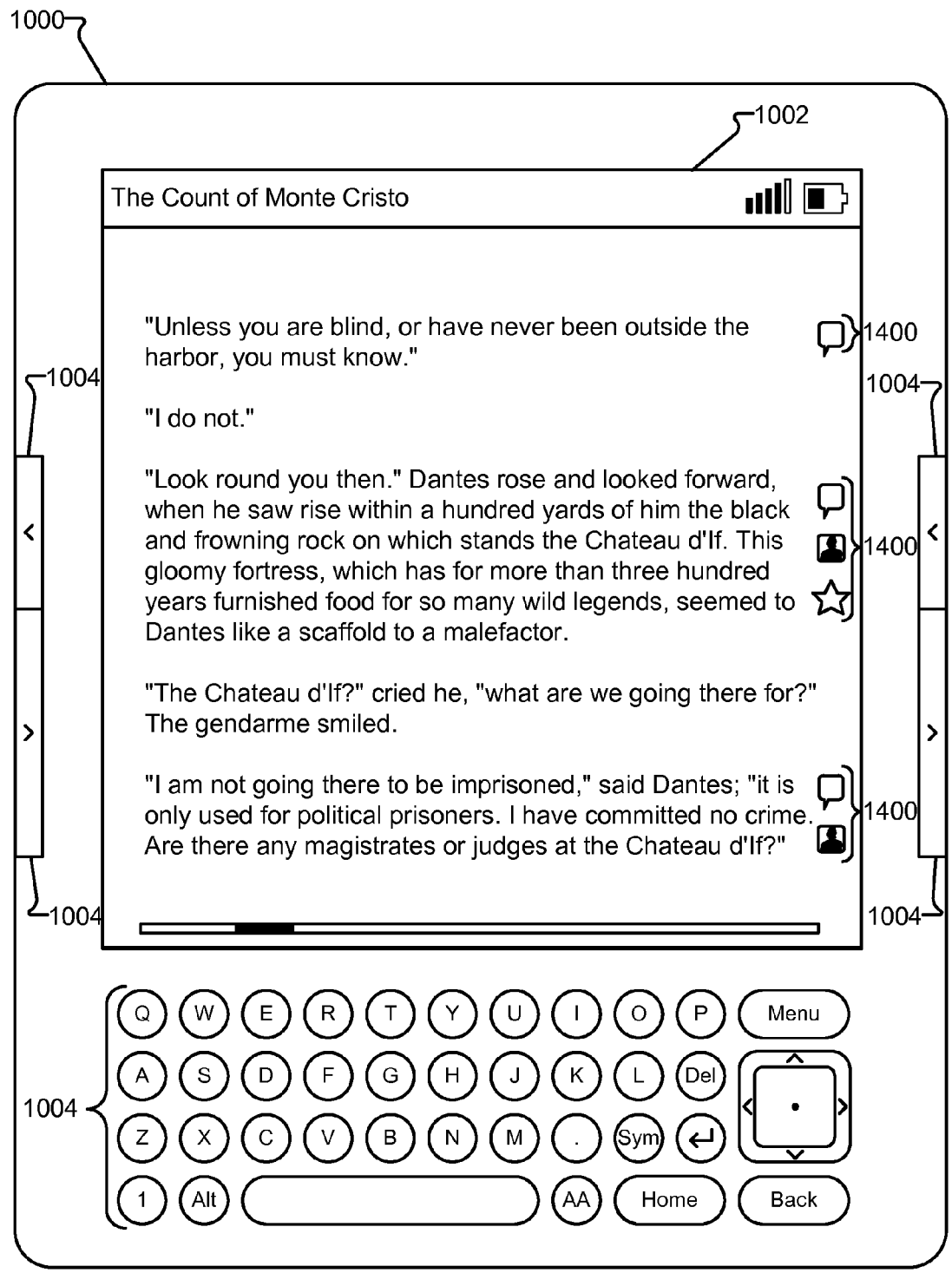
FIGS. 14-15 illustrate additional views of the e-Book reader device of FIGS. 10-12 by way of which the user accesses content associated with a particular passage of an e-Book in another alternative manner according to principles described herein.
Figure 15:
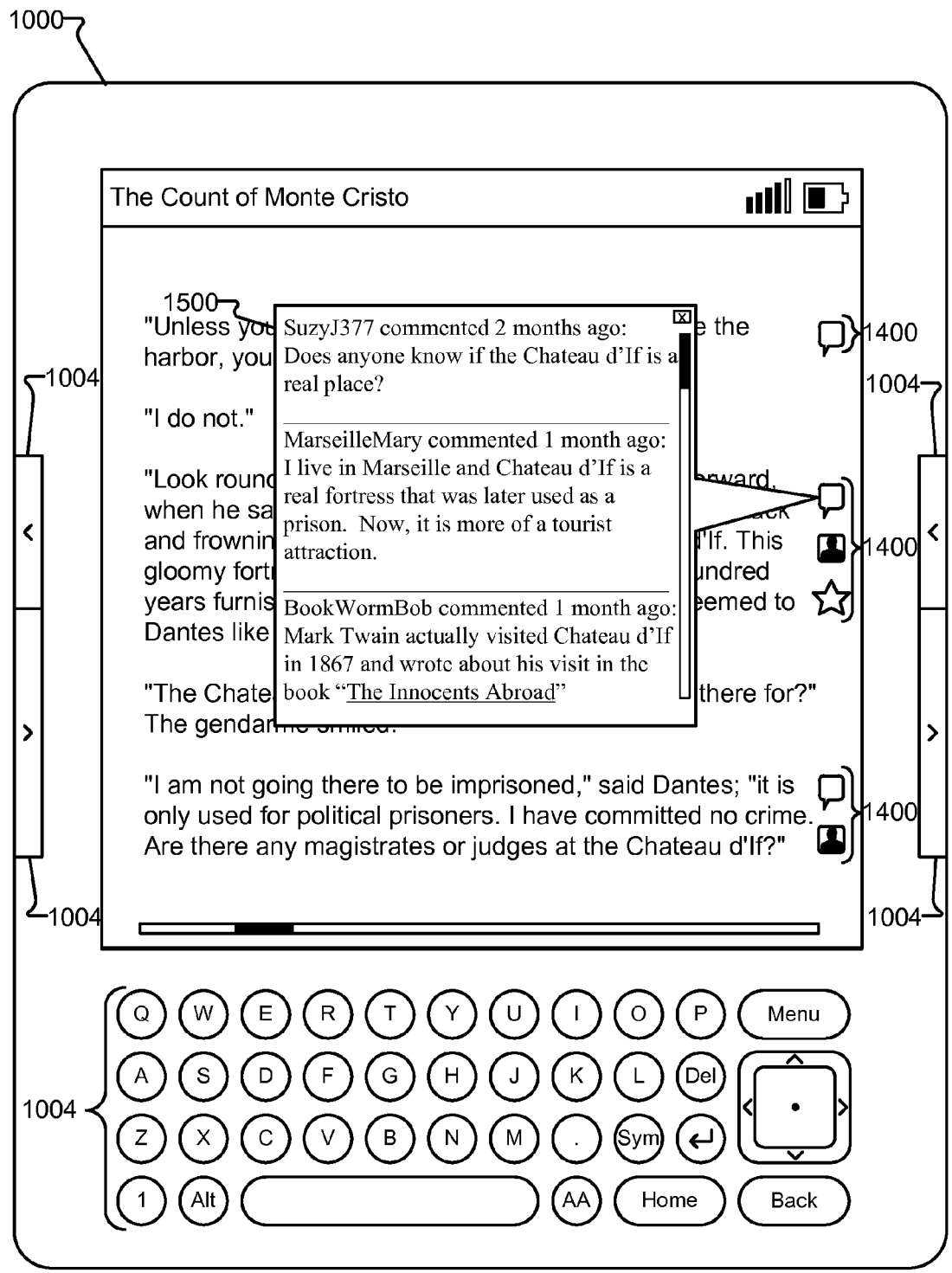

FIGS. 14-15 illustrate an alternative manner of presenting additional content to a user. As shown in FIG. 14, e-Book reader device 1000 may display one or more graphical indicia 1400 configured to indicate the availability of additional content associated with a corresponding passage (e.g., a corresponding paragraph, sentence, line, word, etc.) of the e-Book displayed within display screen 1002. For example, e-Book reader device 1000 may display graphical indicia next to the paragraphs that have additional content associated therewith.

As shown in FIG. 14, in some examples, graphical indicia 1400 may include one or more graphically distinguishable types of graphical indicia representing different types of additional content. For example, a first type of graphical indicia 1400 may represent available comments, a second type of graphical indicia 1400 may represent available images, and a third type of graphical indicia 1400 may represent available additional content of any other type.

In some examples, a user may select and/or "mouseover" a particular graphical indicium 1400 to access corresponding additional content. For example, as shown in FIG. 15, in response to a user selection of a particular graphical indicium 1400, e-Book reader device 1000 may present (e.g., display) a window 1500 including additional content associated with the selected indicium. As shown, window 1500 may be overlaid onto a portion of the e-Book. A user may utilize window 1500 to navigate and/or experience the corresponding additional content and then close window 1500 to continue reading the e-Book.

FIGS. 10-15 are provided for illustrative purposes only and are not limiting. In additional or alternative examples, e-Book reader device 1000 may present additional content in any other suitable manner. In some examples, a user may configure how the additional content is displayed. To illustrate, a user may configure whether additional content is displayed automatically, where additional content is displayed on display screen 1002, whether additional content is displayed by way of a split screen, whether additional content is overlaid onto the e-Book, and/or any other suitable aspect of the presentation of additional content.

In additional or alternative examples, a user may be presented with information summarizing additional content associated with an e-Book. For example, the summary information may indicate how much additional content is associated with the e-Book, a distribution of the additional content (e.g., a distribution among different passages of the e-Book, a distribution among different types of additional content, etc.), what additional content is newest, what portions (e.g., passages) of the e-Book are associated with the most additional content, and/or any other suitable information. In some examples, a user may be provided with a histogram representing the distribution of additional content among different portions of an e-Book.

Although the foregoing examples refer to presenting additional content, corresponding options, and/or corresponding information to one or more users, one will appreciate that the same principles may apply to an author and/or publisher associated with an e-Book. For example, management subsystem 202 may be additionally or alternatively configured to provide an author and/or publisher with access to additional content and/or corresponding information associated with the e-Book. For example, management subsystem 202 may transmit data representative of the additional content to the author/publisher, provide the author/publisher with access to a web-based interface by way of which the author/publisher can access the additional content and/or associated information/statistics, and/or provide the author/publisher with access to the additional content and/or corresponding information in any other suitable manner.

In additional or alternative examples, additional content may be presented to a user (e.g., an end user, a publisher, an author, etc.) in association with a dynamic map. For example, graphical indicia representative of additional content and/or a corresponding user may be displayed within a map interface (e.g., a Google Maps interface) at corresponding locations. To illustrate, the locations of the graphical indicia may correspond to a location of a provider of the additional content, a location mentioned within a particular passage, a location mentioned (e.g., in a comment) and/or portrayed (e.g., in an image) in the corresponding additional content, a location tagged by a user, and/or a location associated with the additional content and/or the user in any other suitable manner. Accordingly, users may be able to view additional content in context with corresponding geographic areas and/or regions.

Although some of the foregoing examples refer to user-generated additional content, one will appreciate that additional content may be automatically/intelligently generated and/or delivered by management subsystem 202. For example, management subsystem 202 may automatically provide a user with user-specific e-Book recommendations based on the e-Books and/or corresponding particular passages that the user reads, based on a user profile associated with the user, based on additional content provided by the user (e.g., additional content requesting e-Book recommendations), and/or in accordance with any other attributes associated with a user and/or corresponding e-Books. In additional or alternative examples, management subsystem 202 may be configured to provide a user with automatically generated additional content in any other suitable manner.

Figure 16:
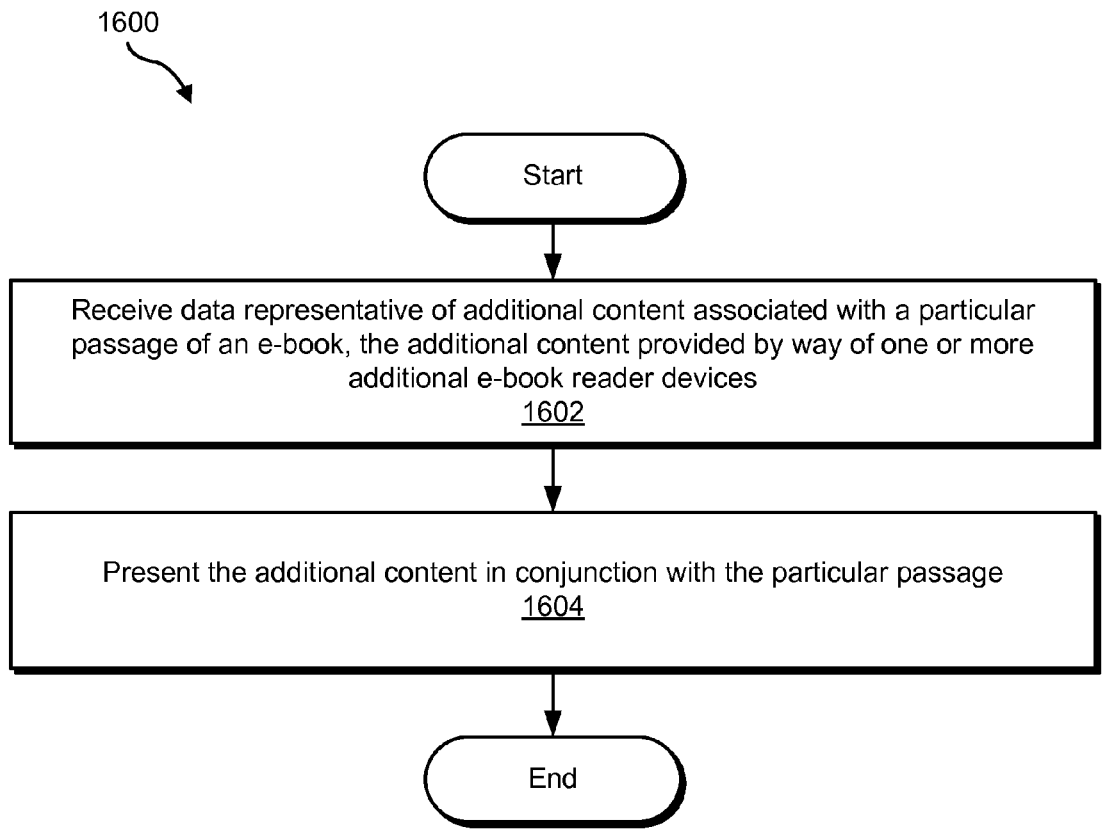
FIG. 16 illustrates an exemplary method of accessing content associated with a particular passage of an e-Book according to principles described herein.

FIG. 16 illustrates another exemplary method 1600 of accessing content associated with a particular passage of an e-Book. While FIG. 16 illustrates exemplary steps according to one embodiment, other embodiments may omit, add to, reorder, and/or modify any of the steps shown in FIG. 16. One or more of the steps shown in FIG. 16 may be performed by any component or combination of components of system 100.

In step 1602, an e-Book reader device receives data representative of additional content associated with a particular passage of an e-Book. In some examples, the additional content may be provided by way of one or more additional e-Book reader devices. For example, the e-Book reader device may receive data representative of any suitable additional content associated with any suitable passage of the e-Book and provided by way of any suitable e-Book reader devices, such as described herein.

In step 1604, the e-Book reader device presents the additional content in conjunction with the particular passage. For example, the e-Book reader device may be configured to present the additional content in any suitable manner, such as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 17:
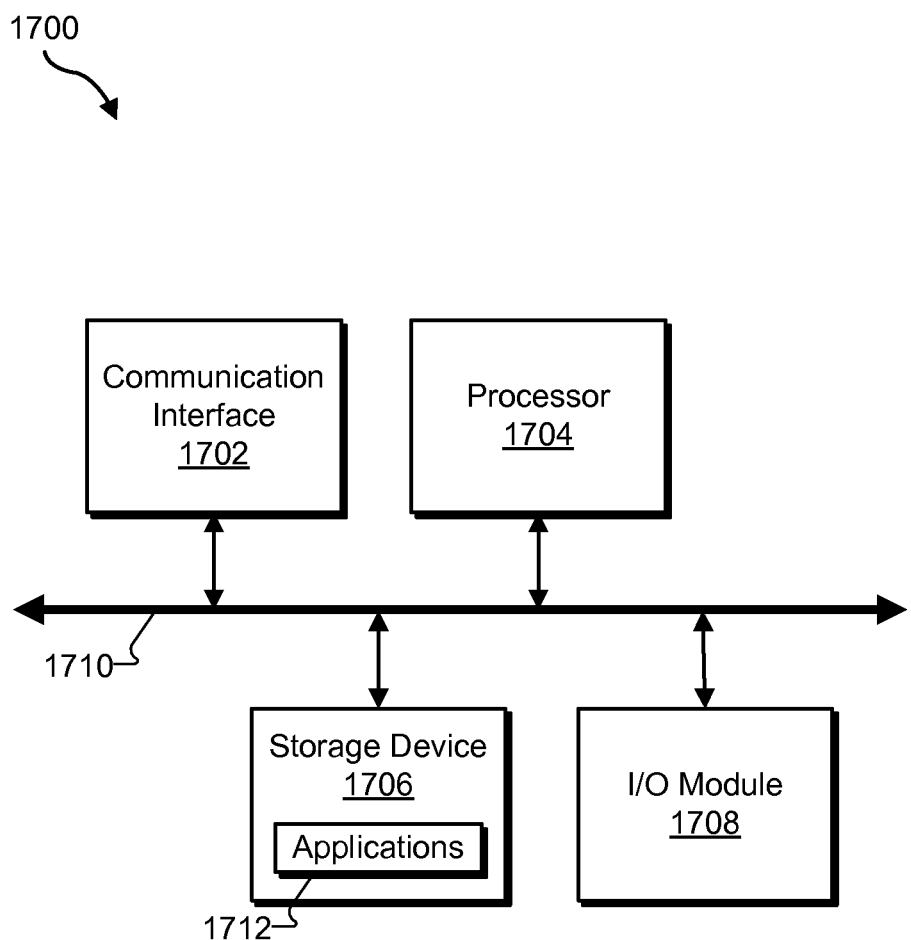
FIG. 17 illustrates an exemplary computing device according to principles described herein.

FIG. 17 illustrates an exemplary computing device 1700 that may be configured to perform one or more of the processes described herein. As shown in FIG. 17, computing device 1700 may include a communication interface 1702, a processor 1704, a storage device 1706, and an input/output ("I/O") module 1706 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, and any other suitable interface. In at least one embodiment, communication interface 1702 may provide a direct connection between system 100 and one or more provisioning systems via a direct link to a network, such as the Internet. Communication interface 1702 may additionally or alternatively provide such a connection through, for example, a local area network (such as an Ethernet network), a personal area network, a telephone or cable network, a satellite data connection, a dedicated URL, or any other suitable connection. Communication interface 1702 may be configured to interface with any suitable communication media, protocols, and formats, including any of those mentioned above.

Processor 1704 generally represents any type or form of processing unit capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1706. For example, data representative of one or more executable applications 1712 (which may include, but are not limited to, one or more of the software applications described herein) configured to direct processor 1704 to perform any of the operations described herein may be stored within storage device 1706. In some examples, data may be arranged in one or more databases residing within storage device 1706.

I/O module 1706 may be configured to receive user input and provide user output and may include any hardware, firmware, software, or combination thereof supportive of input and output capabilities. For example, I/O module 1706 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1706 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1706 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1700. For example, one or more applications 1712 residing within storage device 1706 may be configured to direct processor 1704 to perform one or more processes or functions associated with management facility 102 and/or presentation facility 104. Likewise, storage facility 106 may be implemented by or within storage device 1706.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a content management subsystem from a first e-Book reader device, data representative of additional content associated with a particular passage of an e-Book; and
   transmitting, by the additional content management subsystem, the data representative of the additional content to a second e-Book reader device for presentation in conjunction with the particular passage of the e-Book,
   wherein the transmitting of the data representative of the additional content to the second e-Book reader device occurs in association with
      a selection, by the user of the second e-Book reader device, of at least the particular passage to access a menu of selectable options associated with the at least the particular passage, and
      a selection, by the user of the second e-Book reader device, of an option included in the menu of selectable options to access the additional content associated with the at least the particular passage.

2. The method of claim 1, wherein the additional content comprises a comment associated with the particular passage.

3. The method of claim 1, wherein the additional content comprises one or more images associated with the particular passage.

4. The method of claim 3, wherein the one or more images comprise at least one of an illustration associated with the particular passage and a photograph associated with the particular passage.

5. The method of claim 1, wherein the additional content comprises at least one citation to or from another publication.

6. The method of claim 1, further comprising providing, by the content management subsystem, the data representative of the additional content for access by at least one of an author and a publisher of the e-Book.

7. The method of claim 1, further comprising transmitting, by the content management subsystem, data representative of promotional content associated with the e-Book to the second e-Book reader device.

8. The method of claim 1, further comprising receiving, by the content management subsystem from the first e-Book reader device, one or more user-configurable parameters configured to govern the distribution of the additional content.

9. The method of claim 8, wherein the transmitting the data representative of the additional content to the second e-Book reader device is in accordance with the one or more user-configurable parameters.

10. The method of claim 1, embodied as computer-executable instructions on at least one non-transitory computer-readable medium.

11. A method comprising:
    receiving, by an e-Book reader device, data representative of additional content associated with a particular passage of an e-Book, the additional content provided by way of one or more additional e-Book reader devices;
    detecting, by the e-Book reader device, a user selection of at least the particular passage, the user selection comprising a user interaction with the text of the particular passage;
    presenting, by the e-Book reader device in response to the user selection of the at least the particular passage, a menu of selectable options associated with the at least the particular passage, the menu of selectable options including an option to access additional content associated with the at least the particular passage and an option to create additional content associated with the at least the particular passage;
    detecting, by the e-Book reader device, a user selection of the option to access additional content associated with the at least the particular passage; and
    presenting, by the e-Book reader device in response to the detection of the user selection of the option to access additional content associated with the at least the particular passage, the additional content in conjunction with the particular passage.

12. The method of claim 11, wherein the presenting of the additional content comprises overlaying the additional content onto at least a portion of the e-Book.

13. The method of claim 11, wherein the presenting of the additional content comprises presenting a first viewing pane including at least a portion of the particular passage and a second viewing pane including at least a portion of the additional content.

14. The method of claim 11, wherein the presenting of the additional content is at least partially automatic.

15. The method of claim 11, wherein the presenting of the additional content in conjunction with the particular passage comprises simultaneously displaying at least a portion of the particular passage and at least a portion of the additional content by way of a display screen associated with the e-Book reader device.

16. The method of claim 11, wherein the additional content comprises one or more comments associated with the particular passage.

17. The method of claim 11, further comprising receiving, by the e-Book reader device, one or more user-configurable parameters configured to govern the presentation of the additional content;
    wherein the presenting of the additional content is in accordance with the one or more user-configurable parameters.

18. The method of claim 11, embodied as computer-executable instructions on at least one non-transitory computer-readable medium.

19. The method of claim 11, wherein the user interaction with the text of the particular passage includes marking the text of the particular passage.

20. The method of claim 19, wherein the marking of the text of the particular passage includes highlighting the text of the particular passage.

21. A system comprising:
at least one computing device comprising:
a content management facility configured to manage additional content associated with a particular passage of an e-Book, wherein the additional content is provided to the content management facility by way of one or more e-Book reader devices; and
a presentation facility communicatively coupled to the content management facility and configured to
detect a user selection of at least the particular passage via an additional e-Book reader device, the user selection comprising a user interaction with the text of the particular passage;
present, via the additional e-Book reader device in response to the user selection of the at least the particular passage, a menu of selectable options associated with the at least the particular passage, the menu of selectable options including an option to access additional content associated with the at least the particular passage and an option to create additional content associated with the at least the particular passage;
detect a user selection of the option to access additional content associated with the at least the particular passage; and
present, by way of the additional e-Book reader device in response to the detection of the user selection of the option to access additional content associated with the at least the particular passage, the additional content in conjunction with the particular passage of the e-Book.

22. A system comprising:
at least one server device configured to
receive, from one or more e-Book reader devices, data representative of additional content associated with a particular passage of an e-Book, and
transmit the data representative of the additional content to one or more additional e-Book reader devices in association with
a selection, by one or more users of the one or more additional e-Book reader devices, of at least the particular passage to access a menu of selectable options associated with the at least the particular passage, and
a selection, by the one or more users of the one or more additional e-Book reader devices, of an option included in the menu of selectable options to access the additional content associated with the at least the particular passage.

23. The system of claim 22, wherein a particular e-Book reader device within the one or more additional e-Book reader devices is configured to
receive the data representative of the additional content from the at least one server device, and
present the additional content in conjunction with the particular passage.

* * * * *